Figure 1:
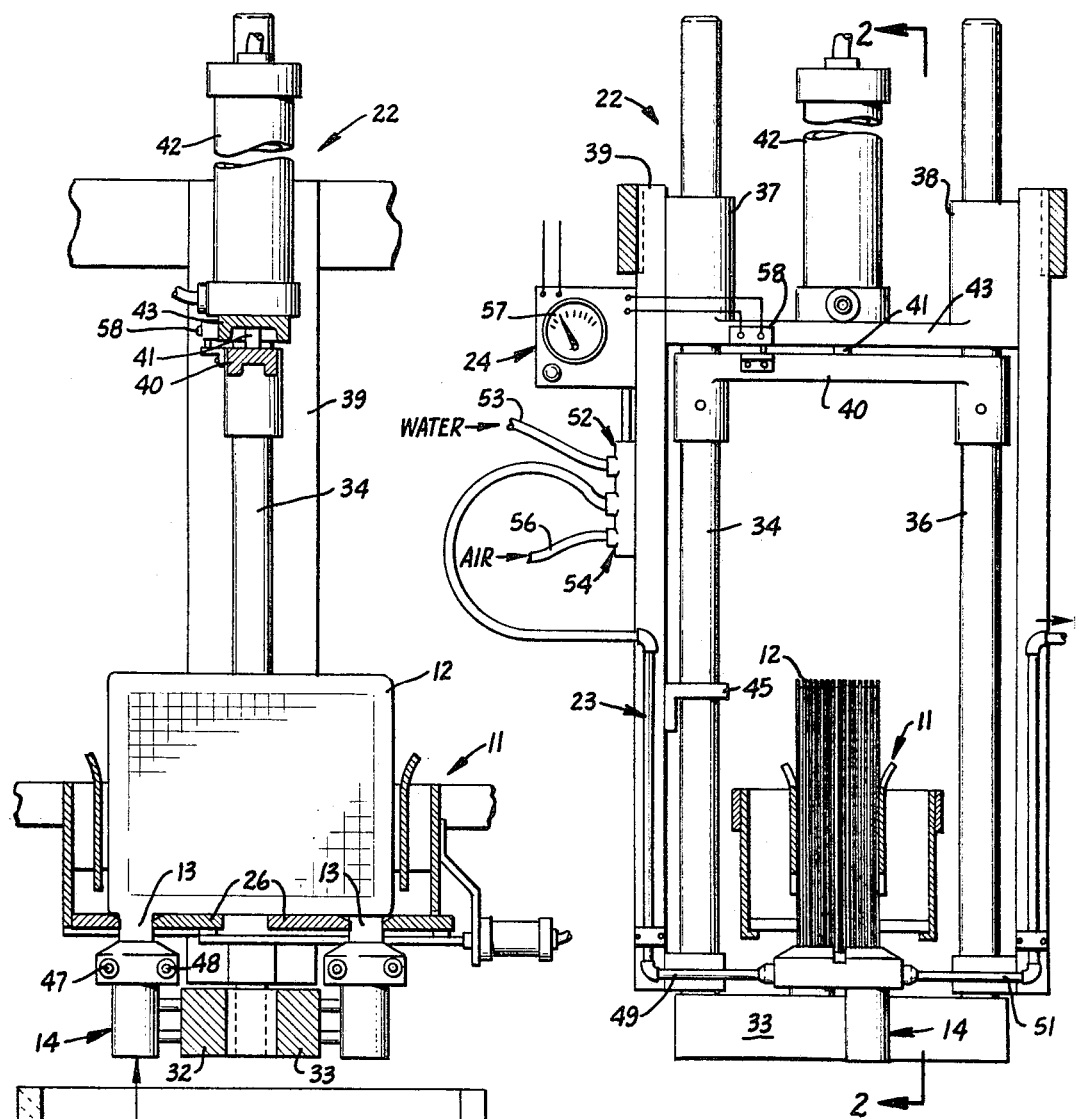

Aug. 6, 1968    R. G. TIEGEL    3,395,748
METHOD AND APPARATUS FOR FABRICATING BATTERY CONNECTOR STRAPS
Filed June 4, 1964    2 Sheets-Sheet 1

INVENTOR.
RALPH G. TIEGEL
BY Schapp & Hatch
ATTORNEYS

Aug. 6, 1968  R. G. TIEGEL  3,395,748
METHOD AND APPARATUS FOR FABRICATING BATTERY CONNECTOR STRAPS
Filed June 4, 1964  2 Sheets-Sheet 2
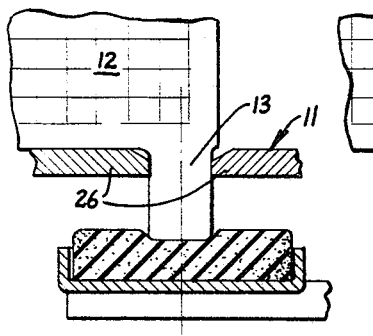
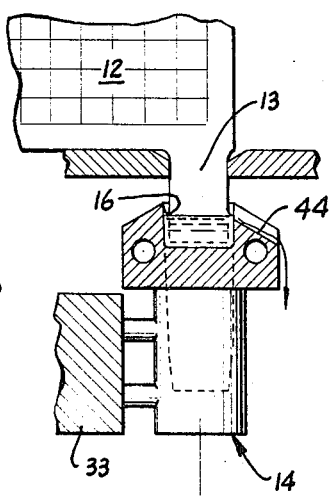
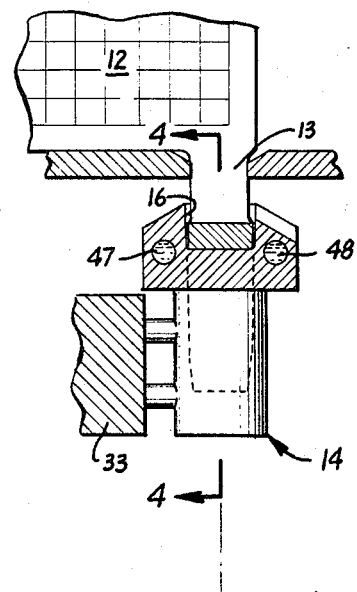
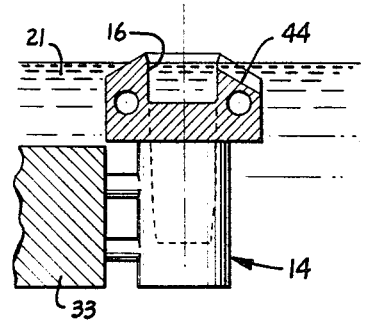
FIG. 3A.   FIG. 3B.   FIG. 3C.
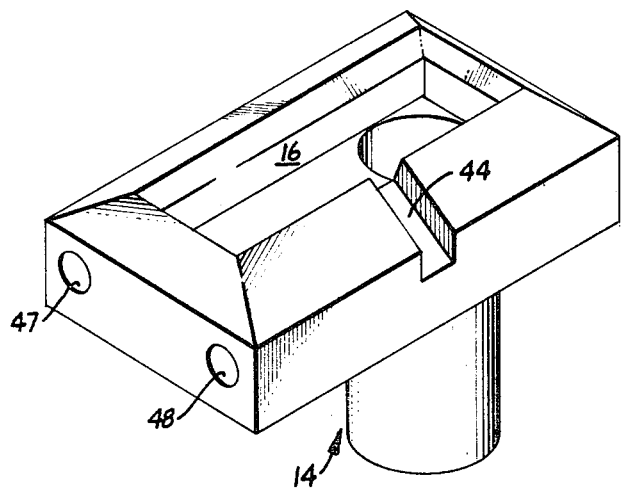
FIG. 5.
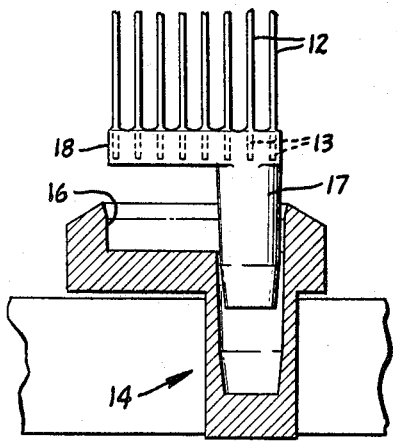
FIG. 4.
INVENTOR.
RALPH G. TIEGEL
BY Schapp & Hatch
ATTORNEYS United States Patent Office 3,395,748
Patented Aug. 6, 1968

3,395,748
METHOD AND APPARATUS FOR FABRICATING BATTERY CONNECTOR STRAPS
Ralph G. Tiegel, San Carlos, Calif., assignor to Tiegel Manufacturing Co., Belmont, Calif., a corporation of California
Filed June 4, 1964, Ser. No. 372,524
10 Claims. (Cl. 164—103)

This invention relates to improvements in a Method and Apparatus for Fabricating Battery Connector Straps, and more particularly to the securing of an integrally formed battery post and connector strap to the connector lugs of a group of battery plates.

In the manufacture of electrical storage batteries such as the lead-acid batteries commonly used in the automotive field, groups or stacks of battery plates and separators are contained in separate cells in the battery case. It is necessary to provide electrical connection between all of the positive plates and between all of the negative plates in a particular cell. This is normally accomplished by securing a lead connector strap to connector lugs which project upwardly from the battery plates. Usually, the battery posts are formed integrally with the connector strap.

Throughout the industry today the battery post and its connector strap are normally cast as a unit and then attached to the connector lugs by a lead burning operation. While this type of attachment is generally satisfactory, it is rather expensive because of the multiplicity of operations involved in first casting the post and strap and thereafter burning each connector lug onto the strap. It has long been apparent that casting of the connector strap and post directly onto the connector lugs would be advantageous from a time and cost standpoint, but such method has heretofore failed to replace the burning method because of certain disadvantages.

Previous attempts to cast the battery strap and post directly onto the connector plate lugs, commonly called the "cast-on" method, have proven unsuccessful for the following reasons. In the first place the weld between the strap and lug has often been quite poor because of insufficient fusion or contamination at the area of weld. Various means have been proposed to eliminate this problem and secure good welds, the principal one being a precise control of the temperature of the molten lead and the connector lug when they are brought into contact with each other. Secondly, when temperatures are sufficiently high to obtain a good weld, erosion and weakening of the lugs themselves often take place. This is particularly true of the portion of the lug immediately above the upper surface of the molten lead, the lugs often being eroded completely through at this point. Here again, the only solutions previously advanced have been to control the temperatures to an extremely narrow range in which welding can take place without causing complete melting of the connector lugs. The precise control of temperatures has required such large quantities of equipment as to make the use of the cast-on method commercially impractical. A third difficulty previously encountered in attempting the cast-on method is the weakening of the strap and post because of sponginess or contamination of the lead with oxides or other dross.

The present invention contemplates a method and apparatus which overcomes the foregoing difficulties by use of a novel approach to such problems. Basically, this approach contemplates dipping of a mold member into a quantity of molten lead contained in a reservoir, with the mold member and contained lead being capable of functioning as a heat sink to absorb heat from the large supply of molten metal in the reservoir in quantities sufficient to maintain the lead within the mold at a temperature high enough to insure rapid welding with the battery plate connector lugs when the latter are immersed therein. The mold member maintains such temperatures for a period of time sufficient for optimum fusion and welding to take place and the mold and contents are thereafter suddenly chilled to halt the melted and fusing action short of weakening or eroding the connector lugs. This makes for a much quicker operation, increasing production and eliminating precise temperature controls.

Accordingly it is a principal object of the present invention to provide a method and apparatus for casting a battery strap and integral post onto the connector lugs of a group of battery plates in a precisely controlled manner providing improved fusion and welding of the strap to the lugs and eliminating excessive melting or erosion of the lugs.

Another object of the invention is to provide a method and apparatus of the character described in which the cast strap and post are dense and free of sponginess, hard spots and contamination by oxides or other dross.

A further object of the invention is to provide a method and apparatus of the character described in which a smoothly filleted juncture is effected between the lugs and the strap so as to improve mechanical strength and provide longer battery life.

A still further object of the invention is to provide a method and apparatus of the character described in which the completed strap and post assembly may be pulled directly from the mold by means of the plate connector lugs without requiring additional ejectors or other devices.

Another object of the invention is to provide a method for casting battery plate post connector straps onto plate connector lugs in which the lead is quickly solidified at the fusion area as soon as welding has taken place in order to eliminate undesired melting or erosion of the lugs, and so that shrinkage of the solidifying lead does not occur in the weld zone.

Still another object of the invention is to provide a method of the character described in which the connector lugs are dipped into molten lead in the mold so as to eliminate mechanical erosion by flowing streams of molten lead.

Another object of the invention is to provide an apparatus for casting battery post straps onto the connector lugs of battery plates in which the mold and the lead contained therein may be maintained at optimum temperatures for rapid fusion and welding while the battery lugs are dipped into the molten lead, and in which the mold and contained lead may be quickly chilled at the fusion area to solidify the molten lead before erosion or excessive melting of the connector lugs can take place.

Yet another object of the invention is to provide an apparatus of the character described which includes a mold member formed for dipping a quantity of uncontaminated molten lead from a relatively large reservoir supply, the mold being adapted to maintain the lead within the mold at a desired molten state for a period of time sufficient for optimum welding and fusion to take place between the molten lead and the connector lugs immersed therein.

A further object of the present invention is to provide a mold of the character described which is formed to shed excess lead in a manner eliminating unwanted feathering of lead at the upper surface of the mold.

Further objects and advantages of the invention will be apparent as the specification progresses, and the new and useful features of the invention will be fully defined in the claims attached hereto.

Figure 2:
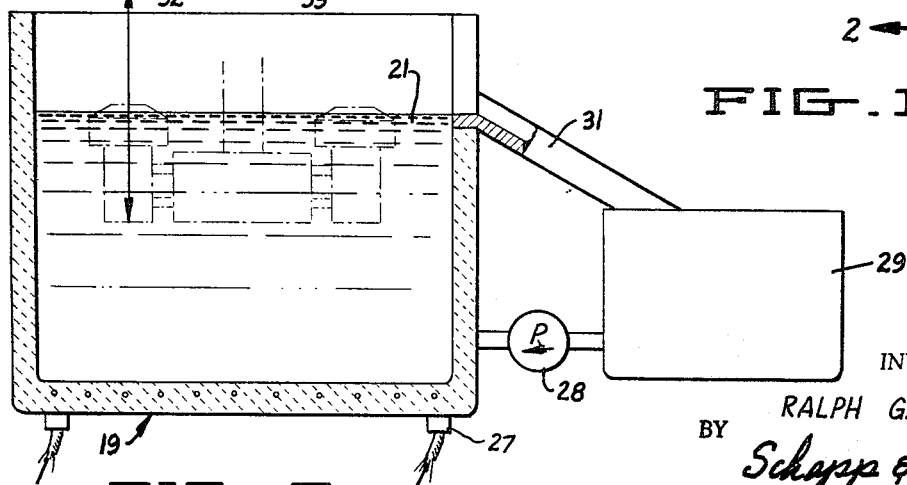

The preferred form of the invention is illustrated in the accompanying drawings forming part of this specification, in which:

FIGURE 1 is a side elevational view of an apparatus constructed in accordance with the present invention;

FIGURE 2, a vertical sectional view taken substantially on the plane of line 2—2 of FIGURE 1;

FIGURE 3a, an enlarged fragmentary vertical cross-sectional view illustrating a typical mold member and associated battery plate connector lug, with the mold member being shown in dipping relation to a reservoir of molten lead;

FIGURE 3b, a view similar to that of FIGURE 3a but illustrating the mold member moved upwardly from the reservoir of molten lead to surround the lower ends of the connector lugs with the molten lead contained in the mold member;

FIGURE 3c, a view similar to that of FIGURE 3b but illustrating a subsequent condition of the mold in which the cooling fluid is passing therethrough to chill and solidify the lead contained in the mold member;

FIGURE 4, a vertical cross-sectional view taken substantially on the plane of line 4—4 of FIGURE 3c but illustrating the battery post connector strap and connector lug assembly partially removed from the mold member; and FIGURE 5, a perspective view of a typical mold member used in the apparatus.

While only the preferred form of the invention is shown, it should be understood that various changes or modifications may be made within the scope of the claims attached hereto without departing from the spirit of the invention.

*Apparatus*

Referring to the drawings in detail, it will be seen that the apparatus for fabricating battery connector straps of the present invention includes means 11 for releasably supporting a group of battery plates 12 with their connector lugs 13 projecting downwardly in aligned relation, mold means 14 formed to provide an open top cavity 16 defining a battery post 17 and connector strap 18, a reservoir 19 adapted to contain a pool of molten lead 21, means 22 formed for dipping the mold means 14 into the pool 21 of molten lead and for lifting the cavity 16 into surrounding relation to the bottom ends of the connector lugs 13 whereby the latter will be immersed in molten lead contained in the cavity, heat exchange means 23 associated with the mold means 14 and operative for rapidly chilling the post 17 and strap 18 to solidify the lead, and control means 24 for activating the heat exchange means 23 to provide such chilling a timed period after the lugs 13 are immersed in the molten lead contained in the mold cavity 16.

In accordance with the present invention the battery plates are supported with their connector lugs 13 projecting downwardly in aligned relation in position to receive the mold means 14 as it rises up to them. For this purpose the positive and negative plates which ordinarily occupy one cell of a storage battery are supported on edge in side by side relation with the usual separators positioned between the plates. The assembled group is inverted 180° from the position it normally occupies in the battery in order to place the lugs 13 in the desired depending position. When so assembled and held, the connector lugs of the positive plates will be aligned with each other as will be the positive lugs of the negative plates, in the manner best seen in FIGURE 2 of the drawings.

As here shown, the grouped battery plates are supported on and gripped by pairs of horizontally disposed bars 26. Preferably at least one of each pair of bars is movable toward and away from the other of the pair in order to align and grip the connector lugs adjacent to their juncture with the body of the battery plate.

The reservoir 19 is formed to contain a relatively large body of molten lead 21 and is provided with suitable heating means 27 for maintaining the lead at a desired temperature. The upper surface of the molten lead is maintained at a precisely defined position by a recirculating system which includes a pump 28 adapted to supply molten lead to the reservoir from an overflow tank 29 adapted to receive molten metal overflow from the reservoir through a conventional overflow spout 31, the vertical positioning of spout 31 determining the location of the liquid level. This system serves to maintain a pure supply of molten metal in the reservoir, any scum, oxides, etc. being carried off by the recirculating metal passing through the overflow spout 31. If desired, means may be provided for skimming the surface of the metal immediately prior to dipping of the mold means 14 therein.

As here shown, the mold means 14 is reciprocated vertically to alternately dip the molds into the reservoir and bring them up into surrounding relation to the bottom ends of the connector lugs 13. It should be apparent, however, that the molds could stand still and the reservoir 19 and plate assembly 11 could reciprocate vertically to achieve the same result. As may be seen from FIGURES 1 and 2 of the drawings, vertical reciprocation of the mold means 14 is here accomplished by securing the mold means to spaced parallel bars 32 and 33 which are in turn vertically reciprocable. For this purpose, the opposite ends of bars 32–33 are secured to vertical rods 34 and 36 journaled for axial movement in bearing members 37 and 38 carried at the upper end of a supporting framework 39. Vertical displacement of rods 34–36 is accomplished by means of a yoke 40 secured to these rods and to the piston rod 41 of a pneumatic cylinder 42 supported on a cross-member 43 of the framework 39. Supplying of air under pressure to the upper end of cylinder 42 will move the assembly downwardly to dip the mold means into the molten metal 21 contained in reservoir 19, and supplying of air to the lower end of the cylinder will cause the mold means to move upwardly into the desired surrounding relation to the bottom ends of the connector lugs 13. In order to insure precise positioning of the mold members 14 relative to the surface of the molten lead 21 contained in reservoir 19, stop means 45 may be provided on the framework 39 in position to intercept and limit the downward stroke of yoke 40.

The shape of the mold members which constitute the mold means 14 may best be seen in FIGURES 4 and 5 of the drawings. As there shown, the walls of the mold extend upwardly from the liquid level of the molten lead contained therein, see FIGURE 3a. This insures that the upper edge of the mold walls will never be immersed in the liquid lead and hence there will be no opportunity for a thin flange or feather of lead to form as might occur if the mold were dipped entirely under the surface of the molten lead. When the mold is moved upwardly to the position illustrated in FIGURES 3b and 3c of the drawings, the entry of the lower ends of the connector lugs 13 into the mold cavity tends to cause the level of molten lead contained therein to rise. In order to prevent this rise from slopping lead over the top of the mold walls, and in order to provide a skimming action calculated to remove oxidized flux, etc., a sloping overflow passage 44 is formed in one wall of the mold member.

Preferably, a convential fluxing material is applied to the connector lugs 13, or at least to the lower ends thereof, before the mold is moved upwardly to the position illustrated in FIGURE 3b. This fluxing material may be of any suitable type and may be applied in any suitable manner such as by contacting the lower ends of the connector lugs 13 with a sponge impregnated with the fluxing material.

As an important feature of the present invention, the mold member is adapted to absorb sufficient heat from the reservoir of molten metal 21 to maintain the lead contained in the mold cavity in molten form and at the proper temperature for effecting an optimum bonding or welding of the connector lugs 13 to the battery post connector strap 18 when the connector lugs are dipped into the mold cavity. To accomplish this the mold members 14 are fabricated of relatively heat conductive material and low thermo mass in order to effect quick heating and cooling of the mold as desired. A large surface area exposed to the molten lead is desirable for accomplishing rapid heat exchange. Enough thermo mass exists in the mold and molten lead to maintain the molten lead at the desired high temperatures when the battery plate connecting lugs 13 are dipped therein. It has been found that a number of materials will satisfy the above requirements while providing reasonable strength at elevated temperatures, good heat conduction and a relatively low coefficient of expansion, for example mild steel or beryllium copper.

In accordance with the present invention, the heat exchange means 23 is operative for effecting a rapid chilling of the mold and its contents in order to solidify the molten lead as soon as the optimum bond has been obtained in order to prevent erosion, melting or other weakening of the connector lugs 13. As will be apparent, the rapid chilling of the mold and its contents could be effected in a variety of ways. However, it is preferred to utilize a stream of relatively cool fluid impinging upon the mold in heat exchanging relation in order to cool the mold as rapidly as possible.

While it is possible to direct a stream of fluid coolant against the outside of the mold, it is preferred for reasons of increased efficiency and safety to pass the stream of coolant through suitable passageways formed in the walls of the mold. As here shown, such passageways are provided by bores 47 and 48 which extend from one end of the mold member to the other on opposite sides of the mold cavity 16. Connected to the passages 47–48 are supply tubes 47 and 51 adapted for connection to a source of fluid coolant under pressure and an exhaust respectively.

Although any sutable fluid coolant may be used, in most instances it will be preferred to utilize a liquid coolant because of more effective heat absorption characteristics, particularly when passing from liquid phase to vapor phase. Ordinary water has proven to be well adapted for present purposes and possesses the additional advantages of being cheap and readily available. Moreover, water obtained from ordinary supply sources will be available in quantities sufficient to accomplish its cooling function and be disposed of without requiring additional heat exchanging apparatus for recondensing. Accordingly, the supply tubes 49 are here connected to a control valve 52 which is in turn adapted for connection to a source of water under pressure, preferably through a flexible hose 53 accommodating the vertical movement of the molds.

The rapid cooling of the mold accomplished by the present apparatus adds greatly to the productivity of the machine by allowing higher lead temperatures and at the same time greatly reducing the waiting time necessary for the moldten metal to harden in the mold. Thus, the described cooling provides a dual advantage of speeding up the fusing and welding action while at the same time greatly reducing cycling times, thus substatially increasing the possible output per mold.

Further speeding up of the operating cycle of the apparatus is here accomplished by providing a valve 54 adapted for connection through hose 56 to a source of air under pressure. As soon as chilling of the mold and its contents is obtained through the use of the cooling water, water valve 52 is shut off and air valve 54 opened to immediately blow the water out from the tubes 49–51 and the passages 47–48 so that trapped coolant will not interfere with the rapid heating of the mold in the subsequent cycle.

The cast-on integral battery post and connector strap pro vided by the described apparatus is illustrated in FIGURE 4 of the drawings. As may be seen therein, the menisucs assumed by the upper surface of the molten lead when the connector lugs are dipped thereinto forms smooth fillets at the juncture of the connector lugs with the molten lead due principally to the flux on the plate lugs. The described rapid chilling solidifies the molten lead in this configuration and provides a very strong mechanical joint which is highly resistant to vibration and shock. Moreover, the halting of the fusing and welding action at the fusion area at the optimum moment provides a very strong bond between the connector lug and the connector strap but does not weaken the connector lugs because of excessive melting, erosion or pulling away of the welded areas due to shrinkage.

The control means 24 may be of any suitable form capable of activating the valve 52 to supply coolant to the mold at the desired point in the welding and fusion process. Preferably, the control means 24 includes a timing device which may be adjusted to provide a precise time delay between the time at which the mold is moved up into surrounding relation to the connector lug and the time at which the valve 52 is opened to effect rapid chilling of the mold and its contents. As here shown, the contron means 24 includes a conventional adjustable timer 57 which is activated by contact of yoke 40 with the microswitch 58 electrically connected to the timer. By making the timer adjustable, it is possible to compensate for comparative wide variations in the temperature of the molten lead contained in reservoir 19 thus giving added flexibility and utility to the present apparatus.

*Method*

In practicing the method of the present invention, a group of positive and negative battery plates arranged in alternating relation and having the usual separators sandwiched therebetween, are assembled and oriented with the usual battery connector lugs depending in aligned relation below the group. Obviously, the connector lugs of the positive plates are aligned with each other and the connector lugs of the negative plates are also aligned with each other at a location separated from the location of the connector lugs for the positive plates. A conventional type of battery plate and connector lug configuration is illustrated in the accompanying drawings.

In carrying out the method of the present invention, an open top mold having an internal cavity defining the desired configuration of the battery post and attached strap is filed with molten lead. Preferably the filling is accomplished by lowering the mold 14 into a supply of molten lead 21 maintained in a reservoir 19. This mode of supplying molten lead to the mold affords a relatively dense and non-spongey texture of metal and at the same time heats up the mold to approach the temperature of the surrounding molten lead.

The depending connector lugs 13 of the battery plates are then dipped into the molten lead contained in mold cavity 16, preferably by lifting the molds out of the reservoir and moving them upwardy into surrounding relation to the lower ends of the connector lugs. The dipping of the connector lugs into the molten lead already in the molds eliminates any problem of mechanical erosion as might occur if the connector lugs were positioned in the mold before the molten lead was added.

In accordance with the present invention the mold is maintained at a temperature high enough to heat the lead in molten condition before and during the immersion of the connector lugs therein and for a period of time sufficient to insure optimum fusion and welding between the connector lugs and the resulting battery post connector strap. This maintaining of the temperature of the mold is accomplished by utilizing the heat sink characteristc of the mold to absorb enough heat from the molten metal contained in the reservoir during immersion of the mold therein. Thus, the temperature at which the molten lead in the reservoir 19 is maintained determines the length of time in which the mold will maintain the lead contained therein in the desired molten condition.

As soon as an optimum weld has been obtained, the mold is immediately chilled below the melting point of the lead so as to solidify the battery post strap and prevent erosion of the connector lugs. The chilling action is obtained by directing a stream of relatively low temperature fluid into a heat exchanging relation to the lead in the mold a timed period after immersion of the connector lugs therein. Preferably, for heat exchange efficiency, the fluid is a liquid such as oil or water, and for reasons of efficiency and economy it is preferred to utilize water as a coolant. It has been found that increased efficiency and safety and improved control of the chilling step may be accomplished by passing the coolant liquid through passages in the walls of the mold.

The method and apparatus of the present invention is capable of operating efficiently through temperature ranges of considerably wider latitude than have heretofore been possible. For example it will be apparent that in order to achieve an optimum weld, the surface portion of the connector lug must melt and fuse with the surrounding molten metal. The precise control afforded by the present invention over the amount of surface melting of the connector lugs makes it possible to operate at relatively high temperature without danger of melting more of the connector lug than is desired. Hence in performing the present method, the temperature of the molten lead in the mold may vary from about 650° F. to about 900° F. The lower end of the temperature range, of course, is the melting point of the particular formulation of lead used and the upper limit is set at about 900° F. in order to avoid formation of excess oxides. The temperature range given is illustrative and may be varied somewhat to suit changing conditions.

An additional advantage of the method and apparatus of the present invention lies in its ability to turn out many more battery strap connector lugs than previously known equipment having a comparable number of mold cavities. This is principally due to the provision for rapidly chilling the mold and solifying the battery post connector strap at exactly the right moment to obtain an optimum weld to the battery plate connector lugs. This rapid chilling combined with the mechanical strength of the connector strap and its attachment to the connector lugs permits the post and strap to be pulled directly from the chilled mold, thus eliminating any requirement for ejectors or the like. This is particularly important in the present apparatus because of the necessity for immersing the molds in the reservoir of molten lead.

From the foregoing it will be seen that the method and apparatus of the present invention provides a highly flexible and efficient mode of forming battery post connector straps and securing them to the battery plate connector lugs, the apparatus being capable of operating through comparatively wide temperature ranges to produce a strong and sturdy post and strap in a minimum of time and with a maximum of mechanical strength.

I claim:

1. The method of casting battery post straps onto the connector lugs of groups of battery plates, comprising the steps of filling an open top battery post strap mold with molten lead while heating the mold to a temperature of the order of the molten lead therein, immersing appropriate connector lugs of a group of battery plates in the molten lead in said mold, maintaining said mold at a temperature high enough to keep the lead molten before and during immersion for a period sufficient to insure a good weld of the connector lugs to the battery post strap, and contacting said mold with a stream of fluid of comparatively low temperature a precisely timed interval after said immersion so as to chill said mold and the lead contained therein rapidly to halt melting of said connector lugs at the end of said period.

2. The method of casting battery post straps onto the connector lugs of groups of battery plates, comprising the steps of filling an open top battery post strap mold with molten lead while heating the mold to a temperature of the order of the molten lead therein, immersing appropriate connector lugs of a group of battery plates in the molten lead in said mold, controlling the temperature of said mold and the lead contained therein before and during immersion to a range in which the lead will be kept molten and will bond readily to the connector lugs, and effecting rapid chilling of said mold a precisely timed interval after said immersion to solidify the lead forming bonds as soon as a good bond is obtained between said lead each of and said connector lugs and before material erosion of the connector lugs.

3. The method as defined in claim 2 and wherein said temperature range is between about 650° F. and about 900° F.

4. The method of casting battery post straps onto the connector lugs of groups of battery plates, comprising the steps of dipping an open top battery post strap mold into a pool of molten lead, retaining said mold in said pool of molten lead for a time sufficient to fill the mold with lead and to heat the mold sufficiently for the lead to remain molten during subsequent steps, removing said mold from said pool, effecting immersion of desired connector lugs of a group of battery plates in the molten lead in said mold, and directing a stream of relatively low temperature fluid into heat exchanging relation to the lead in said mold in the vicinity of the strap at its junctions with the lugs a timed period after said immersion so as to accomplish immediate solidifying of the molten lead into a battery post strap, said timed period having a duration sufficient for secure welding of said connector lugs to said battery post strap without melting of the lugs above the level of the molten lead.

5. The method as defined in claim 4 and wherein said relatively low temperature fluid is a liquid and is directed through passages formed in the walls of the mold.

6. An apparatus for casting battery post straps onto battery plates, comprising means for releasably supporting a group of battery plates with their connector lugs projecting downwardly in aligned relation, a mold member of relatively heat conductive material having walls defining an open top mold cavity for a battery post strap and formed with a coolant passage in said walls at the upper portion thereof, a reservoir adapted to contain a pool of molten lead, means formed for dipping said mold into said pool of molten lead and for lifting said cavity into surrounding relation to the bottom ends of said connector lugs whereby the latter will be immersed in molten lead contained in said cavity, heat exchanger means adapted for supplying a stream of coolant through said passage for rapidly chilling said mold and solidifying the molten lead, and control means for activating said heat exchange means a precisely timed period after said connector lugs are immersed in the molten lead in the mold cavity so as to solidify the battery post strap at the instant a good weld is obtained and before material erosion of the connector lugs.

7. An apparatus as defined in claim 6 and wherein said control means includes a valve adapted for connection to a source of liquid coolant under pressure and operative when open to admit said coolant to said passage in said mold, together with a timing device formed for opening said valve a desired interval after said mold has been lifted into surrounding relation to said connector lugs.

8. An apparatus as defined in claim 7 and wherein said control means also includes a valve adapted for connection to a source of air under pressure and operative when open for admitting a blast of air to said passage for blowing out any coolant preparatory to again dipping the mold into the pool of molten lead.

9. In a machine for casting battery post straps onto battery plate connector lugs by dipping a mold having an open top mold cavity into a pool of molten lead and lifting the mold to immerse the connecting lugs in the molten lead contained in the mold cavity, a mold structure comprising a mold member having walls defining an open top mold cavity, said walls being fabricated of relatively heat conductive material and formed for rapid heating and cooling, said mold member being adapted to acquire sufficient heat from said pool of molten lead to maintain the lead carried by said mold member in a molten state when said connecting lugs are immersed therein, said mold member being formed with a coolant passage through said walls, and means for selectively admitting a stream of liquid coolant and a blast of air to said coolant passage.

10. In a machine as defined in claim 9, the further limitation that the mold member is formed with an outwardly sloping rim having a notch for admitting molten lead from said pool, and means is provided for limiting the entry of the mold member into said pool short of immersing the top of said rim whereby excess lead will flow readily from the mold and feathering will be prevented.

References Cited

UNITED STATES PATENTS

| | | | |
|---|---|---|---|
| 1,972,945 | 9/1934 | Nilson | 164—120 |
| 2,004,340 | 6/1935 | Patterson | 164—112 |
| 3,253,306 | 5/1966 | Sabatino et al. | 164—260 |
| 3,072,984 | 1/1963 | Bronstert | 164—109 |

J. SPENCER OVERHOLSTER, *Primary Examiner.*

V. K. RISING, *Assistant Examiner.*